June 6, 1933.  J. C. MORTON  1,912,538
MACHINE FOR HARVESTING MAIZE AND SIMILAR ROW FEED CROPS
Filed Sept. 24, 1931  2 Sheets-Sheet 1
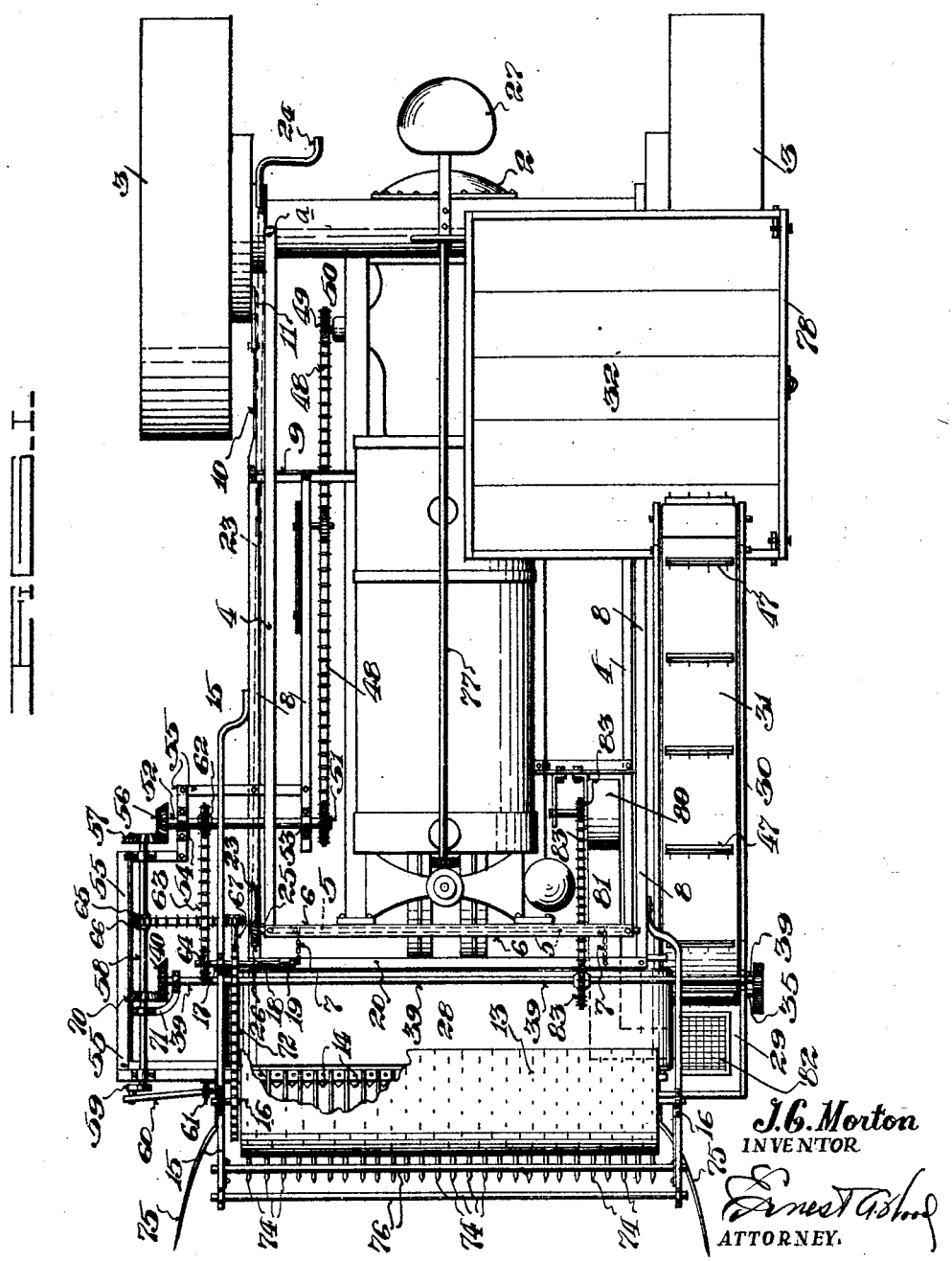
J.C. Morton
INVENTOR
Ernest Ashwood
ATTORNEY.

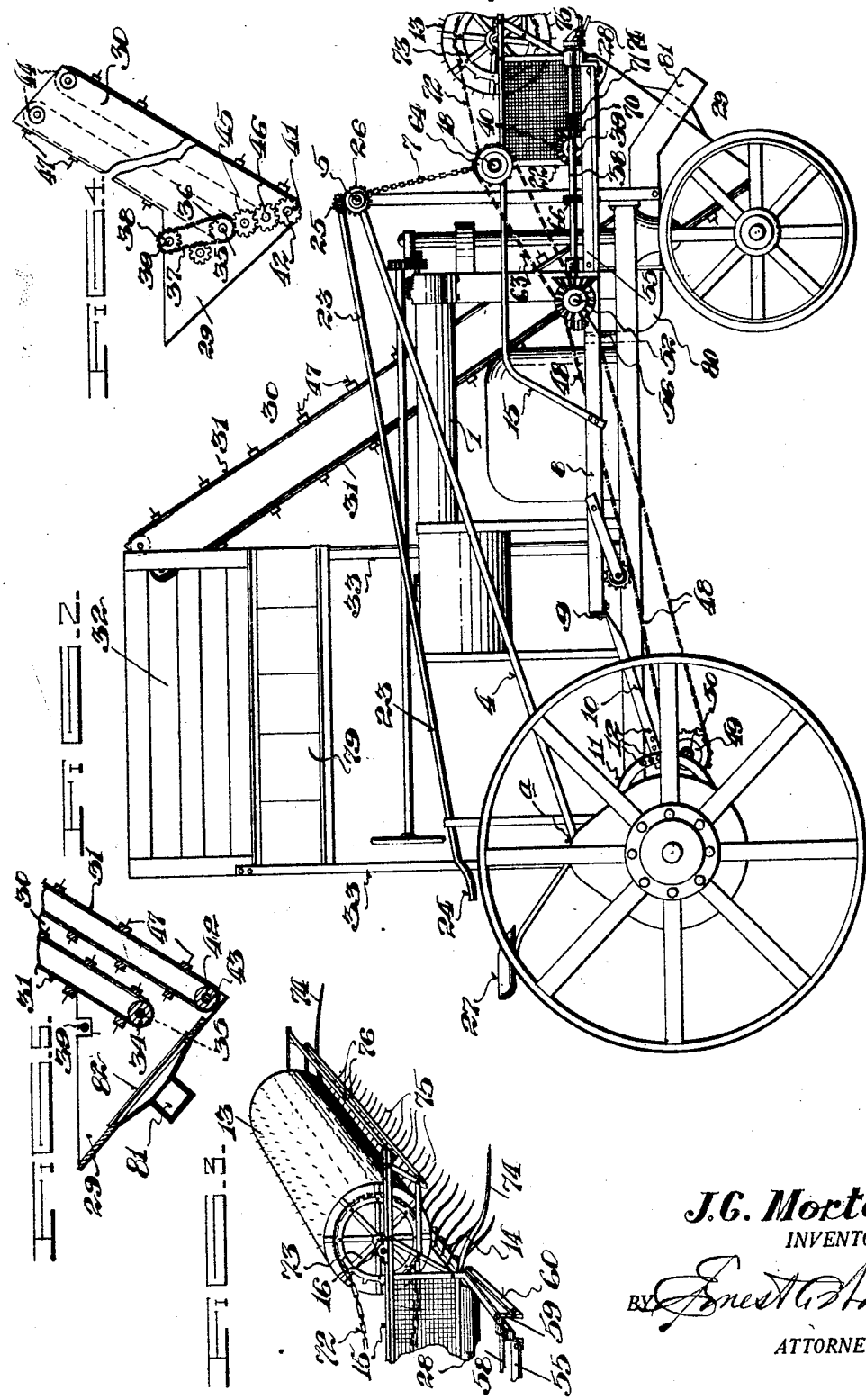

Patented June 6, 1933

1,912,538

UNITED STATES PATENT OFFICE

JAMES C. MORTON, OF GOREE, TEXAS

MACHINE FOR HARVESTING MAIZE AND SIMILAR ROW FEED CROPS

Application filed September 24, 1931. Serial No. 564,755.

This invention relates to harvesting machines and particularly to a machine designed for heading maize, kaffir corn, cane and other analogous vegetation possessing panicles or top foliage suitable for forage.

The principal object of the invention resides in the provision of a machine combining certain elements cooperative to harvest maize heads and the like, the peculiar cooperation of the elements being to guide the heads into the operative area of a cutting means so that they may be severed from the stalk in a uniform manner regardless of the irregular stand of the stalks. It is of course understood that some of the stalks attain considerable height while others are dwarfs. On the other hand the stalks are inclined to bend over under the weight of the heads thereby making harvest difficult. The invention provides for raising the stalks to proper cutting position.

Another object of the invention resides in means for raising and lowering the cutting element at the will of the operator in accordance with the irregular height of the stalks, so that the heads may be cut from the stalks immediately below the head, thereby eliminating as much of the stalk as possible in the harvesting operation since the stalk is foreign matter and makes threshing more or less difficult and is of no value as forage.

Another object of the invention resides in the provision of machine of the character specified capable of being operated as a combine in view of certain provisions in the form of an elevator and receptacle for receiving the heads after they have been severed from the stalks in the manner briefly mentioned above. The machine or apparatus, being designed to be conformably mounted upon a tractor, provides for harvesting the heads quickly and in the most efficient manner and delivered to the receptacle, from which they are discharged into a truck, wagon or other means of conveyance without interrupting the operation of the harvesting machine.

With the foregoing objects as paramount, the invention has particular reference to its salient features of construction and arrangement of parts, which will become manifest as the description proceeds, taken in connection with the accompanying drawings wherein:—

Figure 1 is a plan view of an apparatus constructed according to the present invention.

Figure 2 is a side elevation.

Figure 3 is a detail view in perspective fragmentarily showing the guide and cutting assembly.

Figure 4 is a detail view of the elevator hopper, and

Figure 5 is a detail view fragmentarily showing the cooperating elevator belts by which the commodity, after having been cut, is delivered into the receptacle.

Continuing with a more detailed description of the drawings, 1 designates the fore part of the tractor while 2 designates the transmission and 3 the rear wheels thereof. Before entering into a detailed explanation, it may be well to mention that the invention is comprised only of a frame suitably constructed to carry the elements of the invention and is capable of being readily mounted and detached from any well known type of tractor without altering the tractor in any manner whatsoever.

The frame of the invention is comprised primarily of angle bars 4, disposed on an inclined plane on either side of the tractor and are pivotally joined at $a$ to the rear axle housing of the tractor. The pivotal relationship of the angle bars 4 with the tractor enables these members to be raised and lowered at their opposite ends, which supports the transverse shaft 5. The ends of the bar 4 are secured together by means of an angle bar 6. Chains 7 surround the shaft 5 and are adapted to be wound thereupon to effect raising and lowering of the entire front portion of the frame of the apparatus which carries a guiding and cutting means. A description of the manner in which this operation is carried out will be explained later.

Extending in parallel relationship on either side of the tractor are angle bars 8, whose rear ends are fixed to a transverse angle bar 9, extending across from one side of the tractor to the other. Pivotal relationship between the bars 8 and the tractor is obtained through the medium of bars 10, which are connected to the ends of the bar 9 and to an arcuate bracket 11, which is also joined to the rear axle housing of the tractor. The bracket 11, as well as the connecting ends of the bars 10 is provided with a series of spaced apertures 12. By reason of these apertures and the arcuate shape of the bracket 11, adjustment of the pivotal point upon which the frame comprised of the bars 8, is obtained.

Situated forwardly of the frame structure of the invention is a spiked drum 13, whose function is to compel the upper ends of the stalks carrying the head to move into position to be severed by the sickle blade 14 immediately thereunder, as shown in the cutaway portion of the drum 13 in Figure 1. The construction of the sickle is not unlike the conventional type used in mowers. It will be noted that the angle bars 8 referred to in the foregoing extend well beyond the end of the tractor and afford a support for the elements constituting the guiding and cutting means, which will be explained presently. The angle bars 8 will be referred to hereinafter as the frame of the invention.

Connected to the frame 8 of the invention and extending upwardly and forwardly are beams 15. These beams afford a mounting for bearings 16 in which the ends of the shaft of the spiked drum 13 are journaled. One of the members 15, shown more clearly in Figure 2 provides a mounting for a bearing 17 in which a stub shaft 18 is journaled. The opposite end of the stub shaft 18 is mounted in a bearing 19, which latter is secured to a transverse bar 20. It is to this bar 20 that the ends of the chains 7 are secured, as shown in Figure 1 and which bar 20 is joined at its ends to the bars 8 constituting the frame of the invention. It will be understood that the bearing 19, while it appears in Figure 1 to be affixed directly to the bar 20, is supported upon a standard 22, which standard is mounted upon the said bar 20. This is borne out in Figure 2.

In order to raise and lower the frame 8 of the invention, which, as stated, supports the guiding and cutting arrangement, a rod 23 is provided, the rearmost end of which is formed into a crank 24. The opposite end of the rod 23 has a worm 25 mounted thereon which enmeshes a worm gear 26, carried upon the end of the shaft 5. By rotating the rod 23, cooperation of the worm 25 and gear 26 effects rotation of the shaft 5, thereby winding the chains 7 thereupon. Since the chains 7 are connected to the frame 8 through the medium of the transverse bar 20, the frame is raised and lowered, on its pivot point, which, as stated previously, is formed by the association of the bars 10 and arcuate bracket 11 near the rear end of the tractor. Since the bars 4 which support the shaft 5 are also pivotally connected at $a$ to the rear axle housing of the tractor, they are likewise elevated simultaneously with the elevation of the forward portion of the frame 8 in the manner just described.

It is obvious therefore, that the operator, from his position on the seat 27 will be enabled to effectually raise and lower the forward end of the frame 8 and its associated elements so that the cutting sickle will follow the heights of the stalks and uniformly sever the heads thereof. After the heads are severed, they fall upon an endless belt 28, the upper lead of which is traveling to the left of the machine whereby its load may be dumped into the hopper 29 of the elevator box 30 and to which reference will be later made.

After the commodity is discharged from the belt 28 into the elevator hopper 29, it is elevated by means of a pair of cooperating belts 31 into a receptacle 32, superimposed upon the tractor and supported by uprights 33 well above the operator's position at the machine.

The relationship of the belts 31 which operate in the elevator box 30, may be clearly seen in Figure 5. The upper belt, which is endless, surrounds a roller 34, which is mounted upon a shaft 35 and extends through the wall of the hopper 29. A sprocket 36 is mounted on the protruding end of the roller shaft and is driven by means of a chain 37 surrounding sprocket 38. The latter sprocket is mounted upon a shaft 39, which extends the full width of the machine and has a gear 40 mounted upon its opposite end. The purpose of the gear 40 and its relationship with the other elements of the assembly will be described presently. With further reference to the elevator belts 31, it will be noted in Figure 4 that a gear 41 is provided near the bottom of the elevator hopper 29 and which is mounted upon a shaft 42. The shaft enters the hopper 29 and carries a roller 43 about which the lower belt 31 passes. Idler rollers 44 are provided at the discharge end of the elevator over which the belts 31 operate.

Referring again to Figure 4, it will be noted that gears 45 and 46 form a gear train to insure proper direction of travel of the elevator belts 31. The shaft 39 being a driven shaft, as will be presently explained, the sprocket 38 is rotated, which rotates sprocket 36 through the medium of the chain 37. Gear 45 enmeshes a gear, not shown, mounted behind the sprocket 36 which drives the upper of the two elevator belts. The gear 46 enmeshes the gear 45 and the gear 41 enmeshes the gear 46. Since the shaft 39 revolves in a counter-clockwise direction, the lower roller 34 revolves in a counter-clockwise direction so that the lower lead of the upper belt will travel upwardly. The interposed gears 45 and 46 change the direction of rotation of the shaft 42 which carries the roller 43 over which the lower belt travels. Obviously, the upper lead of the lower belt will also travel upwardly. Accordingly, the heads conveyed by the endless belt 28, when discharged into the elevator hopper 29 will be caught between the lugs 47 of each of the belts and will thereby be conveyed upwardly between the belts and discharged into the receptacle 32.

Referring now to the manner in which the several elements named are driven, a sprocket chain 48 surrounding sprocket 49, mounted upon the power take-off shaft 50 of the tractor and also surrounds a sprocket 51 mounted upon a short shaft 52, which is journaled in a bearing 53 mounted on the frame 8. The short shaft 52 extends at right angles from the frame 8 and its opposite end is journaled in a bearing 54 mounted upon a subframe 55 which extends outwardly from the frame 8 of the invention.

A beveled gear 56 is carried upon the extreme outer end of the short shaft 52 and enmeshes the gear 57 mounted on a shaft 58 whose axis is at right angles to the axis of the shaft 52. The shaft 58 is journaled in bearings disposed upon the subframe 55 and upon its opposite end is mounted a crank 59. A link 60 is connected to the crank at one end while its opposite end is connected to the shaft 61 which carries the sickle 14 and through this arrangement, reciprocating motion is imparted to the sickle. The specific drive will be presently traced out and explained.

The laterally extending shaft 52 has a sprocket 62 mounted thereon intermediate its ends about which a sprocket chain 63 passes to surround a similar sprocket 64 on the end of the stub shaft 18, previously referred to.

The shaft 58, which is mounted in the subframe 55 has a sprocket 65 thereon surrounded by a chain 66 which latter also passes around a similar sprocket mounted upon a shaft 67. The shaft 67 carries a roller, not shown but about which the endless conveyor belt 28 passes and it is through the medium of the arrangement just described that the said conveyor belt 28 is operated. It may be well to mention that the opposite end of the belt 28 surrounds an idler roller 68 on the opposite side of the machine adjacent the elevator hopper 29.

A shaft 58 also carries a beveled gear 70 which enmeshes the beveled gear 40, previously mentioned, carried upon the end of the lower shaft 39 which operates the elevator. A right angle yoke 71 is provided to stabilize the relationship between the gears 40 and 70.

As a suitable drive for the spiked drum 13, a chain 72 is provided which surrounds a large sprocket wheel 73 carried by the drum 13 and a small sprocket, not shown, carried by the stub shaft 18, previously referred to. Referring specifically to the means by which the stalks are moved into position for cutting, it will be noted that a multiplicity of equi-distantly spaced fingers 74 are situated immediately below the spiked drum 13 and are directly forwardly of the machine. In addition to these spaced fingers, there is provided a pair of prongs 75 which extend outwardly in a curved plane on either side of the assembly of fingers 74. As apparent in Figure 2, these fingers are directed slightly downward. The purpose of these prongs is to lift any inclined stalks into an upright position as the machine progresses along the rows and in which position the fingers 74 will engage the heads and as the machine progresses, the heads will be severed by the sickle 14 and fall upon the endless conveyor belt 28 to be conveyed to the elevator 29.

Upon encountering stalks of unusual height, means in the form of transverse bars 76 are provided at the extreme forward end of the machine and directly in front of the spiked drum 13 to push these stalks over so that they may be readily engaged by the projecting fingers 74 to thereby bring them to cutting position.

In operation, motion is imparted to the main drive chain 48 from the power take-off shaft 50 of the tractor, thereby rotating the short transverse shaft 52 and its beveled gear 56. The enmeshed relationship of this gear and the gear 57 imparts rotation to the shaft 58. When the shaft 58 is rotated, the sickle 14 is reciprocated through the crank 59 and link 60. At the same time, the endless conveyor 28 is operated from the shaft 58 through the medium of the chain 66 and shaft 67. Due to the enmeshed relationship of the gears 40 and 70 carried by the shafts 39 and 58 respectively, the elevator belt 31 on the opposite side of the machine will set into operation in accordance with the manner fully explained in the description of the elevator in the foregoing.

Rotation of the short transverse shaft 52, which is directly operated from the main drive chain 48 will move the chain 63 surrounding the same to drive the stub shaft 18. In so driving the stub shaft 18, chain 72 surrounding the same will be moved to impart rotation to the spiked drum 13. As the machine progresses along the row, the operator on the seat 27 may guide the tractor by means of the conventional steering rod 77 and at the same time observe the operation of the invention. By manipulating the crank 24 on the end of the rod 23, you may raise and lower the entire assembly in accordance with the height of the stalks and in so doing, the spaced fingers 74 will engage the stalks and continued progressive movement of the tractor, combined with the rotation of the spiked drum 13 will cause the heads of the stalks to be guided directly into the operative area of the sickle or reciprocating cutter 14 to be severed thereby. The prongs 75 gather the spreading stalks into the sickle 14 and the fingers 74 bring up the drooped heads to the sickle. The bars 76 float down the high stalks and hold them down until they get to the bottom of the spiked drum 13 which latter continues to hold them down and carry them to the sickle 14 which cuts them just below the head. The drum 13 is adjustable vertically and horizontally and the bars 76 are also adjustable to enable the operator to cut the feed to the desired length stem thereby eliminating all long stalks.

In falling upon the moving conveyor 28, the heads are carried to position to be discharged into the hopper 29, there to be taken up by the endless belts 31 and deposited into the receptacle 32. It will be observed that the receptacle 32 is provided with a gate 78 which may be raised from time to time to allow the contents of the receptacle to slide into a wagon or other suitable conveyance driven alongside the tractor. Attention is directed to the fact that the floor 79 of the receptacle 32 is inclined toward one side of the tractor. Such an arrangement obviates the necessity for any means for unloading the receptacle 32, it being obvious that the material will discharge of its own accord when the gate 78 is raised.

As a means to clean the heads of fodder and other foreign matter before it is deposited into the receptacle 32, a blower 80 is mounted upon the frame 8 near the elevator and communicating with which is a duct or conduit 81. This duct discharges into the hopper 29 of the elevator through a grate 82, as apparent in Figures 1 and 5. Thus, all heads falling from the conveyor 28 into the hopper are freed of all foreign matter by a blast of air through the duct 81.

Reference to Figures 1 and 4 will disclose the manner in which the blower is operated. A sprocket and chain assembly 83, driven from the shaft 39 imparts rotation to the impeller in the blower housing.

Manifestly, the construction shown and described is capable of considerable modification and such modification as is considered within the scope and meaning of the appended claims is also considered within the spirit and intent of the invention.

What is claimed is:

1. A row crop feed header and conveyor for tractors comprising in combination, a reciprocating cutting element, a multiplicity of spaced fingers projected forwardly of said cutting element, a spiked drum operating above said cutting element, a hopper for receiving heads severed by said cutting element, means for elevating said heads from said hopper comprising a pair of endless conveyors whose inner leads move in the same direction, whereby to interpose and move said heads to a point of disposal above said tractor and means for discharging foreign matter from said hopper.

2. A row crop feed header and conveyor for tractors comprising in combination a vertically adjustable frame, a receptacle superimposed upon said frame, means carried by said frame for lifting inclined stalks, a reciprocating cutting element for cutting the heads of said stalks, a spiked drum operating above said cutting element, a conveyor belt for receiving heads severed by said cutting element, means for elevating said heads discharged from said conveyor belt into said receptacle comprising a pair of endless conveyors whose inner leads move in the same direction, whereby to interpose and move said heads to a point of disposal above said tractor, means for discharging foreign matter from said receptacle, and a common means for driving said cutting element conveyor belt, and pair of endless conveyors.

3. A heading apparatus and conveyor for tractors comprising in combination a frame arranged to be secured to said tractor and capable of pivotal relationship therewith, means for effecting pivotal movement of said frame from the operator's position on said tractor, a reciprocating cutting element, means in advance of said cutting element for moving a plurality of heads of vegetation into a common plane for subjection to the action of said cutting element, an endless conveyor for receiving severed heads of said vegetation, means for elevating said heads discharged from said conveyor belt comprising a pair of endless conveyors whose inner leads move in the same direction, whereby to interpose and move said heads to a point of disposal above said tractor, and means for receiving the discharge from said pair of endless conveyors.

4. A heading apparatus and conveyor for tractors comprising in combination a vertically adjustable head cutter, means in advance of said head cutter for moving a plurality of heads of vegetation into a common plane for subjection to the action of said head cutter, an endless conveyor for receiving severed heads of said vegetation, a hopper for receiving heads discharged from said conveyor, means for elevating said heads from said hopper comprising a pair of endless conveyors whose adjacent leads move in the same direction, whereby to interpose and move said heads to a point of disposal above said tractor, and means for separating foreign matter from said heads.

In testimony whereof I affix my signature.

JAMES C. MORTON.